(12) United States Patent
Schlichting et al.

(10) Patent No.: US 7,622,195 B2
(45) Date of Patent: Nov. 24, 2009

(54) THERMAL BARRIER COATING COMPOSITIONS, PROCESSES FOR APPLYING SAME AND ARTICLES COATED WITH SAME

(75) Inventors: Kevin W. Schlichting, Storrs, CT (US); David A. Litton, Rocky Hill, CT (US); Michael J. Maloney, Marlborough, CT (US); Melvin Freling, West Hartford, CT (US); John G. Smeggil, Simsbury, CT (US); David B. Snow, Glastonbury, CT (US)

(73) Assignee: United Technologies Corporation, Hartford, CT (US)

( * ) Notice: Subject to any disclaimer, the term of this patent is extended or adjusted under 35 U.S.C. 154(b) by 250 days.

(21) Appl. No.: 11/328,895

(22) Filed: Jan. 10, 2006

(65) Prior Publication Data

US 2008/0113218 A1   May 15, 2008

(51) Int. Cl.
*B32B 9/00* (2006.01)
*B05D 7/00* (2006.01)

(52) U.S. Cl. .............. 428/469; 428/472; 428/701; 428/702; 427/419.2; 416/241 B (58) Field of Classification Search .............. None
See application file for complete search history.

(56) References Cited

U.S. PATENT DOCUMENTS

| | | | |
|---|---|---|---|
| 3,528,861 A | 9/1970 | Elam et al. | |
| 3,542,530 A | 11/1970 | Talboom, Jr. et al. | |
| 3,649,225 A | 3/1972 | Simmons, Jr. | |
| 3,676,085 A | 7/1972 | Evans et al. | |
| 3,754,903 A | 8/1973 | Goward et al. | |
| 4,078,922 A | 3/1978 | Magyar et al. | |
| 4,585,481 A | 4/1986 | Gupta et al. | |
| 2007/0160859 A1 | 7/2007 | Darolia et al. | |

*Primary Examiner*—Timothy M Speer
(74) *Attorney, Agent, or Firm*—Bachman & LaPointe, P.C.

(57) ABSTRACT

A process of coating an article includes the steps of (1) applying a ceramic based compound to at least one surface of an article to form a layer of ceramic based compound; (2) applying at least one inert compound upon the ceramic based compound layer to form a protective layer, wherein the at least one inert compound is composed of a first inert compound having a cubic crystalline structure of formula (I) $A_3B_2X_3O_{12}$, or a second inert compound comprising a hexagonal crystalline structure of formula (II) $A_4B_6X_6O_{26}$, or a mixture of the first inert compound and the second inert compound; (3) optionally drying the coated article; (4) optionally repeating steps (2) and (3); and (5) heat treating the coated article.

59 Claims, 4 Drawing Sheets

THERMAL BARRIER COATING COMPOSITIONS, PROCESSES FOR APPLYING SAME AND ARTICLES COATED WITH SAME

BACKGROUND OF THE INVENTION

The invention relates to thermal barrier coating compositions, processes for applying same and articles coated with same. More particularly, the invention relates to thermal barrier coating compositions designed to withstand sand infiltration, processes for applying same and articles coated with same.

The degradation of turbomachinery parts due to sand related distress of thermal barrier coatings ("TBCs") is a concern with respect to all turbomachinery in use in the Middle East. Sand related distress is responsible for the premature spallation of TBCs and oxidation of turbomachinery and their parts. The mechanism of such sand related distress is the penetration of the TBCs by molten sand. During its useful life, sand may enter the turbomachinery, agglomerate and become molten upon the TBC surface. Typically the surface temperature of the turbomachinery is higher than the melting point temperature of the sand. As a result, the agglomerated sand particles become somewhat molten, penetrate the TBC and reach the ceramic/metallic interface. The failure of the TBC occurs by a combination of molten sand attacking the thermally grown oxide at the ceramic/metallic interface as well as the reduction in strain tolerance, of the fully infiltrated TBC, to thermal cycling. Failure of the TBC occurs by spallation which exposes the part's surface to the elements, thus causing the accelerated oxidation of the turbomachinery part in conjunction with molten sand attack.

Consequently, there exists a need for a thermal barrier coating designed to resist sand related distress.

SUMMARY OF THE INVENTION

In accordance with the present invention, a process of coating an article broadly comprising (1) applying a ceramic based compound to at least one surface of an article to form a layer of ceramic based compound; (2) applying at least one inert compound upon the ceramic based compound layer to form a protective layer, wherein the at least one inert compound comprises a first inert compound comprising a cubic crystalline structure of formula (I):

$$A_3B_2X_3O_{12} \tag{I}$$

where A comprises at least one of the metals selected from the group consisting of $Ca^{+2}$, $Gd^{+3}$, $In^{+2}$, $Mg^{+2}$, $Na^+$, $K^+$, $Fe^{+2}$, $La^{+2}$, $Ce^{+2}$, $Pr^{+2}$, $Nd^{+2}$, $Pm^{+2}$, $Sm^{+2}$, $Eu^{+2}$, $Gd^{+2}$, $Tb^{+2}$, $Dy^{+2}$, $Ho^{+2}$, $Er^{+2}$, $Tm^{+2}$, $Yb^{+2}$, $Lu^{+2}$, $Sc^{+2}$, $Y^{+2}$, $Ti^{+2}$, $Zr^{+2}$, $Hf^{+2}$, $V^{+2}$, $Ta^{+2}$, $Cr^{+2}$, $W^{+2}$, $Mn^{+2}$, $Tc^{+2}$, $Re^{+2}$, $Fe^{+2}$, $Os^{+2}$, $Co^{+2}$, $Ir^{+2}$, $Ni^{+2}$, $Zn^{+2}$, and $Cd^{+2}$; where B comprises at least one of the metals selected from the group consisting of $Zr^{+4}$, $Hf^{+4}$, $Gd^{+3}$, $Al^{+3}$, $Fe^{+3}$, $La^{+2}$, $Ce^{+2}$, $Pr^{+2}$, $Nd^{+2}$, $Pm^{+2}$, $Sm^{+2}$, $Eu^{+2}$, $Gd^{+2}$, $Tb^{+2}$, $Dy^{+2}$, $Ho^{+2}$, $Er^{+2}$, $Tm^{+2}$, $Yb^{+2}$, $Lu^{+2}$, $In^{+3}$, $Sc^{+2}$, $Y^{+2}$, $Cr^{+3}$, $Sc^{+3}$, $Y^{+3}$, $V^{+3}$, $Nb^{+3}$, $Cr^{+3}$, $Mo^{+3}$, $W^{+3}$, $Mn^{+3}$, $Fe^{+3}$, $Ru^{+3}$, $Co^{+3}$, $Rh^{+3}$, $Ir^{+3}$, $Ni^{+3}$, and $Au^{+3}$; where X comprises at least one of the metals selected from the group consisting of $Si^{+4}$, $Ti^{+4}$, $Al^{+4}$, $Fe^{+3}$, $Cr^{+3}$, $Sc^{+3}$, $Y^{+3}$, $V^{+3}$, $Nb^{+3}$, $Cr^{+3}$, $Mo^{+3}$, $W^{+3}$, $Mn^{+3}$, $Fe^{+3}$, $Ru^{+3}$, $Co^{+3}$, $Rh^{+3}$, $Ir^{+3}$, $Ni^{+3}$, and $Au^{+3}$; and where O is oxygen, or a second inert compound comprising a hexagonal crystalline structure of formula (II):

$$A_4B_6X_6O_{26} \tag{II}$$

where A comprises at least one of the metals selected from the group consisting of is $Ca^{+2}$, $Mg^{+2}$, $Fe^{+2}$, $Na^+$, $K^+$, $Gd^{+3}$, $Zr^{+4}$, $Hf^{+4}$, $Y^{+2}$, $Sc^{+2}$, $Sc^{+3}$, $In^{+3}$, $La^{+2}$, $Ce^{+2}$, $Pr^{+2}$, $Nd^{+2}$, $Pm^{+2}$, $Sm^{+2}$, $Eu^{+2}$, $Gd^{+2}$, $Tb^{+2}$, $Dy^{+2}$, $Ho^{+2}$, $Er^{+2}$, $Tm^{+2}$, $Yb^{+2}$, $Lu^{+2}$, $Sc^{+2}$, $Y^{+2}$, $Ti^{+2}$, $Zr^{+2}$, $Hf^{+2}$, $V^{+2}$, $Ta^{+2}$, $Cr^{+2}$, $W^{+2}$, $Mn^{+2}$, $Tc^{+2}$, $Re^{+2}$, $Fe^{+2}$, $Os^{+2}$, $Co^{+2}$, $Ir^{+2}$, $Ni^{+2}$, $Zn^{+2}$, and $Cd^{+2}$; where B comprises at least one of the metals selected from the group consisting of $Gd^{+3}$, $Y^{+2}$, $Sc^{+2}$, $In^{+3}$, $Zr^{+4}$, $Hf^{+4}$, $Cr^{+3}$, $Sc^{+3}$, $Y^{+3}$, $V^{+3}$, $Nb^{+3}$, $Cr^{+3}$, $Mo^{+3}$, $W^{+3}$, $Mn^{+3}$, $Fe^{+3}$, $Ru^{+3}$, $Co^{+3}$, $Rh^{+3}$, $Ir^{+3}$, $Ni^{+3}$, and $Au^{+3}$; where X comprises at least one of the metals selected from the group consisting of $Si^{+4}$, $Ti^{+4}$, $Al^{+4}$, $Cr^{+3}$, $Sc^{+3}$, $Y^{+3}$, $V^{+3}$, $Nb^{+3}$, $Cr^{+3}$, $Mo^{+3}$, $W^{+3}$, $Mn^{+3}$, $Fe^{+3}$, $Ru^{+3}$, $Co^{+3}$, $Rh^{+3}$, $Ir^{+3}$, $Ni^{+3}$, and $Au^{+3}$; and where O is oxygen, or a mixture of the first inert compound and the second inert compound; and (3) heat treating the article.

In accordance with the present invention, a process for coating an article broadly comprising (1) grading a ceramic based compound and at least one inert compound upon at least one surface of an article to form a graded thermal barrier coating, wherein the at least one inert compound comprises a first inert compound comprising a cubic crystalline structure of formula (I):

$$A_3B_2X_3O_{12} \tag{I}$$

where A comprises at least one of the metals selected from the group consisting of $Ca^{+2}$, $Gd^{+3}$, $In^{+3}$, $Mg^{+2}$, $Na^+$, $K^+$, $Fe^{+2}$, $La^{+2}$, $Ce^{+2}$, $Pr^{+2}$, $Nd^{+2}$, $Pm^{+2}$, $Sm^{+2}$, $Eu^{+2}$, $Gd^{+2}$, $Tb^{+2}$, $Dy^{+2}$, $Ho^{+2}$, $Er^{+2}$, $TM^{+2}$, $Yb^{+2}$, $Lu^{+2}$, $Sc^{+2}$, $Y^{+2}$, $Ti^{+2}$, $Zr^{+2}$, $Hf^{+2}$, $V^{+2}$, $Ta^{+2}$, $Cr^{+2}$, $W^{+2}$, $Mn^{+2}$, $Tc^{+2}$, $Re^{+2}$, $Fe^{+2}$, $Os^{+2}$, $Co^{+2}$, $Ir^{+2}$, $Ni^{+2}$, $Zn^{+2}$, and $Cd^{+2}$; where B comprises at least one of the metals selected from the group consisting of $Zr^{+4}$, $Hf^{+4}$, $Gd^{+3}$, $Al^{+3}$, $Fe^{+3}$, $La^{+2}$, $Ce^{+2}$, $Pr^{+2}$, $Nd^{+2}$, $Pm^{+2}$, $Sm^{+2}$, $E^{+2}$, $Gd^{+2}$, $Tb^{+2}$, $Dy^{+2}$, $Ho^{+2}$, $Er^{+2}$, $Tm^{+2}$, $Yb^{+2}$, $Lu^{+2}$, $In^{+3}$, $Sc^{+2}$, $Y^{+2}$, $Cr^{+3}$, $Sc^{+3}$, $Y^{+3}$, $V^{+3}$, $Nb^{+3}$, $Cr^{+3}$, $Mo^{+3}$, $W^{+3}$, $Mn^{+3}$, $Fe^{+3}$, $Ru^{+3}$, $Co^{+3}$, $Rh^{+3}$, $Ir^{+3}$, $Ni^{+3}$, and $Au^{+3}$; where X comprises at least one of the metals selected from the group consisting of $Si^{+4}$, $Ti^{+4}$, $Al^{+4}$, $Fe^{+3}$, $Cr^{+3}$, $Sc^{+3}$, $Y^{+3}$, $V^{+3}$, $Nb^{+3}$, $Cr^{+3}$, $Mo^{+3}$, $W^{+3}$, $Mn^{+3}$, $Fe^{+3}$, $Ru^{+3}$, $Co^{+3}$, $Rh^{+3}$, $Ir^{+3}$, $Ni^{+3}$, and $Au^{+3}$; and where O is oxygen, or a second inert compound comprising a hexagonal crystalline structure of formula (II):

$$A_4B_6X_6O_{26} \tag{II}$$

where A comprises at least one of the metals selected from the group consisting of is $Ca^{+2}$, $Mg^{+2}$, $Fe^{+2}$, $Na^+$, $K^+$, $Gd^{+3}$, $Zr^{+4}$, $Hf^{+4}$, $Y^{+2}$, $Sc^{+2}$, $Sc^{+3}$, $In^{+3}$, $La^{+2}$, $Ce^{+2}$, $Pr^{+2}$, $Nd^{+2}$, $Pm^{+2}$, $Sm^{+2}$, $Eu^{+2}$, $Gd^{+2}$, $Tb^{+2}$, $Dy^{+2}$, $Ho^{+2}$, $Er^{+2}$, $Tm^{+2}$, $Yb^{+2}$, $Lu^{+2}$, $Sc^{+2}$, $Y^{+2}$, $Ti^{+2}$, $Zr^{+2}$, $Hf^{+2}$, $V^{+2}$, $Ta^{+2}$, $Cr^{+2}$, $W^{+2}$, $Mn^{+2}$, $Tc^{+2}$, $Re^{+2}$, $Fe^{+2}$, $Os^{+2}$, $Co^{+2}$, $Ir^{+2}$, $Ni^{+2}$, $Zn^{+2}$, and $Cd^{+2}$; where B comprises at least one of the metals selected from the group consisting of $Gd^{+3}$, $Y^{+2}$, $Sc^{+2}$, $In^{+3}$, $Zr^{+4}$, $Hf^{+4}$, $Cr^{+3}$, $Sc^{+3}$, $Y^{+3}$, $V^{+3}$, $Nb^{+3}$, $Cr^{+3}$, $Mo^{+3}$, $W^{+3}$, $Mn^{+3}$, $Fe^{+3}$, $Ru^{+3}$, $Co^{+3}$, $Rh^{+3}$, $Ir^{+3}$, $Ni^{+3}$, and $Au^{+3}$; where X comprises at least one of the metals selected from the group consisting of $Si^{+4}$, $Ti^{+4}$, $Al^{+4}$, $Cr^{+3}$, $Sc^{+3}$, $Y^{+3}$, $V^{+3}$, $Nb^{+3}$, $Cr^{+3}$, $Mo^{+3}$, $W^{+3}$, $Mn^{+3}$, $Fe^{+3}$, $Ru^{+3}$, $Co^{+3}$, $Rh^{+3}$, $Ir^{+3}$, $Ni^{+3}$, and $Au^{+3}$; and where O is oxygen, or a mixture of the first inert compound and the second inert compound; and (2) heat treating the article.

In accordance with the present invention, a thermal barrier coating broadly comprises a ceramic based compound; and at least one inert compound, wherein the at least one inert compound comprises a first inert compound comprising a cubic crystalline structure of formula (I):

$$A_3B_2X_3O_{12} \tag{I}$$

where A comprises at least one of the metals selected from the group consisting of $Ca^{+2}$, $Gd^{+3}$, $In^{+3}$, $Mg^{+2}$, $Na^+$, $K^+$, $Fe^{+2}$, $La^{+2}$, $Ce^{+2}$, $Pr^{+2}$, $Nd^{+2}$, $Pm^{+2}$, $Sm^{+2}$, $Eu^{+2}$, $Gd^{+2}$, $Tb^{+2}$, $Dy^{+2}$, $Ho^{+2}$, $Er^{+2}$, $Tm^{+2}$, $Yb^{+2}$, $Lu^{+2}$, $Sc^{+2}$, $Y^{+2}$, $Ti^{+2}$, $Zr^{+2}$, $Hf^{+2}$, $V^{+2}$, $Ta^{+2}$, $Cr^{+2}$, $W^{+2}$, $Mn^{+2}$, $Tc^{+2}$, $Re^{+2}$, $Fe^{+2}$, $Os^{+2}$, $Co^{+2}$, $Ir^{+2}$, $Ni^{+2}$, $Zn^{+2}$, and $Cd^{+2}$; where B comprises at least one of the metals selected from the group consisting of $Zr^{+4}$, $Hf^{+4}$, $Gd^{+3}$, $Al^{+3}$, $Fe^{+3}$, $La^{+2}$, $Ce^{+2}$, $Pr^{+2}$, $Nd^{+2}$, $Pm^{+2}$, $Sm^{+2}$, $Eu^{+2}$, $Gd^{+2}$, $Tb^{+2}$, $Dy^{+2}$, $Ho^{+2}$, $Er^{+2}$, $Tm^{+2}$, $Yb^{+2}$, $Lu^{+2}$, $In^{+3}$, $Sc^{+2}$, $Y^{+2}$, $Cr^{+3}$, $Sc^{+3}$, $Y^{+3}$, $V^{+3}$, $Nb^{+3}$, $Cr^{+3}$, $Mo^{+3}$, $W^{+3}$, $Mn^{+3}$, $Fe^{+3}$, $Ru^{+3}$, $Co^{+3}$, $Rh^{+3}$, $Ir^{+3}$, $Ni^{+3}$, and $Au^{+3}$; where X comprises at least one of the metals selected from the group consisting of $Si^{+4}$, $Ti^{+4}$, $Al^{+4}$, $Fe^{+3}$, $Cr^{+3}$, $Sc^{+3}$, $Y^{+3}$, $V^{+3}$, $Nb^{+3}$, $Cr^{+3}$, $Mo^{+3}$, $W^{+3}$, $Mn^{+3}$, $Fe^{+3}$, $Ru^{+3}$, $Co^{+3}$, $Rh^{+3}$, $Ir^{+3}$, $Ni^{+3}$, and $Au^{+3}$; and where O is oxygen, or a second inert compound comprising a hexagonal crystalline structure of formula (II):

$$A_4B_6X_6O_{26} \tag{II}$$

where A comprises at least one of the metals selected from the group consisting of is $Ca^{+2}$, $Mg^{+2}$, $Fe^{+2}$, $Na+$, $K^+$, $Gd^{+3}$, $Zr^{+4}$, $Hf^{+4}$, $Y^{+2}$, $Sc^{+2}$, $Sc^{+3}$, $In^{+3}$, $La^{+2}$, $Ce^{+2}$, $Pr^{+2}$, $Nd^{+2}$, $Pm^{+2}$, $Sm^{+2}$, $Eu^{+2}$, $Gd^{+2}$, $Tb^{+2}$, $Dy^{+2}$, $Ho^{+2}$, $Er^{+2}$, $Tm^{+2}$, $Yb^{+2}$, $Lu^{+2}$, $Sc^{+2}$, $Y^{+2}$, $Ti^{+2}$, $Zr^{+2}$, $Hf^{+2}$, $V^2+Ta^{+2}$, $Cr^{+2}$, $W^{+2}$, $Mn^{+2}$, $Tc^{+2}$, $Re^{+2}$, $Fe^{+2}$, $OS^{+2}$, $CO^{+2}$, $Ir^{+2}$, $Ni^{+2}$, $Zn^{+2}$, and $Cd^{+2}$; where B comprises at least one of the metals selected from the group consisting of $Gd^{+3}$, $Y^{+2}$, $Sc^{+2}$, $In^{+3}$, $Zr^{+4}$, $Hf^{+4}$, $Cr^{+3}$, $Sc^{+3}$, $Y^{+3}$, $V^{+3}$, $Nb^{+3}$, $Cr^{+3}$, $Mo^{+3}$, $W^{+3}$, $Mn^{+3}$, $Fe^{+3}$, $Ru^{+3}$, $Co^{+3}$, $Rh^{+3}$, $Ir^{+3}$, $Ni^{+3}$, and $Au^{+3}$; where X comprises at least one of the metals selected from the group consisting of $Si^{+4}$, $Ti^{+4}$, $Al^{+4}$, $Cr^{+3}$, $Sc^{+3}$, $Y^{+3}$, $V^{+3}$, $Nb^{+3}$, $Cr^{+3}$, $Mo^{+3}$, $W^{+3}$, $Mn^{+3}$, $Fe^{+3}$, $Ru^{+3}$, $Co^{+3}$, $Rh^{+3}$, $Ir^{+3}$, $Ni^{+3}$, and $Au^{+3}$; and where O is oxygen, or a mixture of the first inert compound and the second inert compound.

In accordance with the present invention, a coated article broadly comprises an article comprising at least one surface comprising a thermal barrier coating disposed thereupon, wherein the thermal barrier coating broadly comprises a ceramic based compound; and at least one inert compound comprising a first inert compound comprising a cubic crystal structure of formula (I):

$$A_3B_2X_3O_{12} \tag{I}$$

where A comprises at least one of the metals selected from the group consisting of $Ca^{+2}$, $Gd^{+3}$, $In^{+3}$, $Mg^{+2}$, $Na^+$, $K^+$, $Fe^{+2}$, $La^{+2}$, $Ce^{+2}$, $Pr^{+2}$, $Nd^{+2}$, $Pm^{+2}$, $Sm^{+2}$, $Eu^{+2}$, $Gd^{+2}$, $Tb^{+2}$, $Dy^{+2}$, $Ho^{+2}$, $Er^{+2}$, $Tm^{+2}$, $Yb^{+2}$, $Lu^{+2}$, $Sc^{+2}$, $Y^{+2}$, $Ti^{+2}$, $Zr^{+2}$, $Hf^{+2}$, $V^{+2}$, $Ta^{+2}$, $Cr^{+2}$, $W^{+2}$, $Mn^{+2}$, $Tc^{+2}$, $Re^{+2}$, $Fe^{+2}$, $Os^{+2}$, $Co^{+2}$, $Ir^{+2}$, $Ni^{+2}$, $Zn^{+2}$, and $Cd^{+2}$; where B comprises at least one of the metals selected from the group consisting of $Zr^{+4}$, $Hf^{+4}$, $Gd^{+3}$, $Al^{+3}$, $Fe^{+3}$, $La^{+2}$, $Ce^{+2}$, $Pr^{+2}$, $Nd^{+2}$, $Pm^{+2}$, $Sm^{+2}$, $Eu^{+2}$, $Gd^{+2}$, $Tb^{+2}$, $Dy^{+2}$, $Ho^{+2}$, $Er^{+2}$, $Tm^{+2}$, $Yb^{+2}$, $Lu^{+2}$, $In^{+3}$, $Sc^{+2}$, $Y^{+2}$, $Cr^{+3}$, $Sc^{+3}$, $Y^{+3}$, $V^{+3}$, $Nb^{+3}$, $Cr^{+3}$, $Mo^{+3}$, $W^{+3}$, $Mn^{+3}$, $Fe^{+3}$, $Ru^{+3}$, $Co^{+3}$, $Rh^{+3}$, $Ir^{+3}$, $Ni^{+3}$, and $Au^{+3}$; where X comprises at least one of the metals selected from the group consisting of $Si^{+4}$, $Ti^{+4}$, $Al^{+4}$, $Cr^{+3}$, $Sc^{+3}$, $Y^{+3}$, $V^{+3}$, $Nb^{+3}$, $Cr^{+3}$, $Mo^{+3}$, $W^{+3}$, $Mn^{+3}$, $Fe^{+3}$, $Ru^{+3}$, $Co^{+3}$, $Rh^{+3}$, $Ir^{+3}$, $Ni^{+3}$, and $Au^{+3}$; and where O is oxygen, or a mixture of the first inert compound and the second inert compound.

In accordance with the present invention, a coating broadly comprises a reaction product of at least one silicate based material and a thermal barrier coating composition broadly comprising a ceramic based compound; and at least one inert compound, wherein said at least one inert compound broadly comprises a first inert compound broadly comprising a cubic crystalline structure of formula (I):

$$A_3B_2X_3O_{12} \tag{I}$$

where A comprises at least one of the metals selected from the group consisting of $Ca^{+2}$, $Gd^{+3}$, $In^{+3}$, $Mg^{+2}$, $Na^+$, $K^+$, $Fe^{+2}$, $La^{+2}$, $Ce^{+2}$, $Pr^{+2}$, $Nd^{+2}$, $Pm^{+2}$, $Sm^{+2}$, $Eu^{+2}$, $Gd^{+2}$, $Tb^{+2}$, $Dy^{+2}$, $Ho^{+2}$, $Er^{+2}$, $Tm^{+2}$, $Yb^{+2}$, $Lu^{+2}$, $Sc^{+2}$, $Y^{+2}$, $Ti^{+2}$, $Zr^{+2}$, $Hf^{+2}$, $V^{+2}$, $Ta^{+2}$, $Cr^{+2}$, $W^{+2}$, $Mn^{+2}$, $Tc^{+2}$, $Re^{+2}$, $Fe^{+2}$, $Os^{+2}$, $Co^{+2}$, $Ir^{+2}$, $Ni^{+2}$, $Zn^{+2}$, and $Cd^{+2}$; where B comprises at least one of the metals selected from the group consisting of $Zr^{+4}$, $Hf^{+4}$, $Gd^{+3}$, $Al^{+3}$, $Fe^{+3}$, $La^{+2}$, $Ce^{+2}$, $Pr^{+2}$, $Nd^{+2}$, $Pm^{+2}$, $Sm^{+2}$, $Eu^{+2}$, $Gd^{+2}$, $Tb^{+2}$, $Dy^{+2}$, $Ho^{+2}$, $Er^{+2}$, $Tm^{+2}$, $Yb^{+2}$, $Lu^{+2}$, $In^{+3}$, $Sc^{+2}$, $Y^{+2}$, $Cr^{+3}$, $Sc^{+3}$, $Y^{+3}$, $V^{+3}$, $Nb^{+3}$, $Cr^{+3}$, $Mo^{+3}$, $W^{+3}$, $Mn^{+3}$, $Fe^{+3}$, $Ru^{+3}$, $Co^{+3}$, $Rh^{+3}$, $Ir^{+3}$, $Ni^{+3}$, and $Au^{+3}$; where X comprises at least one of the metals selected from the group consisting of $Si^{+4}$, $Ti^{+4}$, $Al^{+4}$, $Fe^{+3}$, $Cr^{+3}$, $Sc^{+3}$, $Y^{+3}$, $V^{+3}$, $Nb^{+3}$, $Cr^{+3}$, $Mo^{+3}$, $W^{+3}$, $Mn^{+3}$, $Fe^{+3}$, $Ru^{+3}$, $Co^{+3}$, $Rh^{+3}$, $Ir^{+3}$, $Ni^{+3}$, and $Au^{+3}$; and where O is oxygen, or a second inert compound comprising a hexagonal crystalline structure of formula (II):

$$A_4B_6X_6O_{26} \tag{II}$$

where A comprises at least one of the metals selected from the group consisting of is $Ca^{+2}$, $Mg^{+2}$, $Fe^{+2}$, $Na^+$, $K^+$, $Gd^{+3}$, $Zr^{+4}$, $Hf^{+4}$, $Y^{+2}$, $Sc^{+2}$, $Sc^{+3}$, $In^{+3}$, $La^{+2}$, $Ce^{+2}$, $Pr^{+2}$, $Nd^{+2}$, $Pm^{+2}$, $Sm^{+2}$, $Eu^{+2}$, $Gd^{+2}$, $Tb^{+2}$, $Dy^{+2}$, $Ho^{+2}$, $Er^{+2}$, $Tm^{+2}$, $Yb^{+2}$, $Lu^{+2}$, $Sc^{+2}$, $Y^{+2}$, $Ti^{+2}$, $Zr^{+2}$, $Hf^{+2}$, $V^{+2}$, $Ta^{+2}$, $Cr^{+2}$, $W^{+2}$, $Mn^{+2}$, $Tc^{+2}$, $Re^{+2}$, $Fe^{+2}$, $Os^{+2}$, $Co^{+2}$, $Ir^{+2}$, $Ni^{+2}$, $Zn^{+2}$, and $Cd^{+2}$; where B comprises at least one of the metals selected from the group consisting of $Gd^{+3}$, $Y^{+2}$, $Sc^{+2}$, $In^{+3}$, $Zr^{+4}$, $Hf^{+4}$, $Cr^{+3}$, $Sc^{+3}$, $Y^{+3}$, $V^{+3}$, $Nb^{+3}$, $Cr$ , $Mo^{+3}$, $W^{+3}$, $Mn^{+3}$, $Fe^{+3}$, $Ru^{+3}$, $Co^{+3}$, $Rh^{+3}$, $Ir^{+3}$, $Ni^{+3}$, and $Au^{+3}$; where X comprises at least one of the metals selected from the group consisting of $Si^{+4}$, $Ti^{+4}$, $Al^{+4}$, $Cr^{+3}$, $Sc^{+3}$, $Y^{+3}$, $V^{+3}$, $Nb^{+3}$, $Cr^{+3}$, $Mo^{+3}$, $W^{+3}$, $Mn^{+3}$, $Fe^{+3}$, $Ru^{+3}$, $Co^{+3}$, $Rh^{+3}$, $Ir^{+3}$, $Ni^{+3}$, and $Au^{+3}$; and where O is oxygen, or a mixture of said first inert compound and said second inert compound.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

Like reference numbers and designations in the various drawings indicate like elements.

DETAILED DESCRIPTION

As used herein, the term "thermal barrier coating" means a coating comprising a ceramic based compound graded with or mechanically and/or chemically bonded, adhered or affixed to at least one inert compound having either a cubic crystalline structure or a hexagonal crystalline structure.

As used herein, the term "inert compound" means a compound having either a cubic crystalline structure or a hexagonal crystalline structure that exhibits thermodynamic and chemical equilibrium when combined with or makes contact with a ceramic based compound, any silicate based material such as, but not limited to, sand, calcia magnesia alumina silicate and the like.

The thermal barrier coating (hereinafter referred to as "TBC") of the present invention is designed to prevent at least one component of sand such as, but not limited to, calcium magnesia alumina silicate (hereinafter referred to as "CMAS"), from penetrating the ceramic based compound of the TBC, thus causing premature oxidation of the article and preventing spallation of the TBC. Sand generally comprises at least CMAS as well as other components such as, but not limited to, sodium, iron, potassium and the like, depending upon the geographical and geological conditions of the sand. Sands containing iron and CMAS also pose similar problems as described above due to iron-CMAS interaction and penetration of the metallic/ceramic interface of the coated article.

Figure 1:
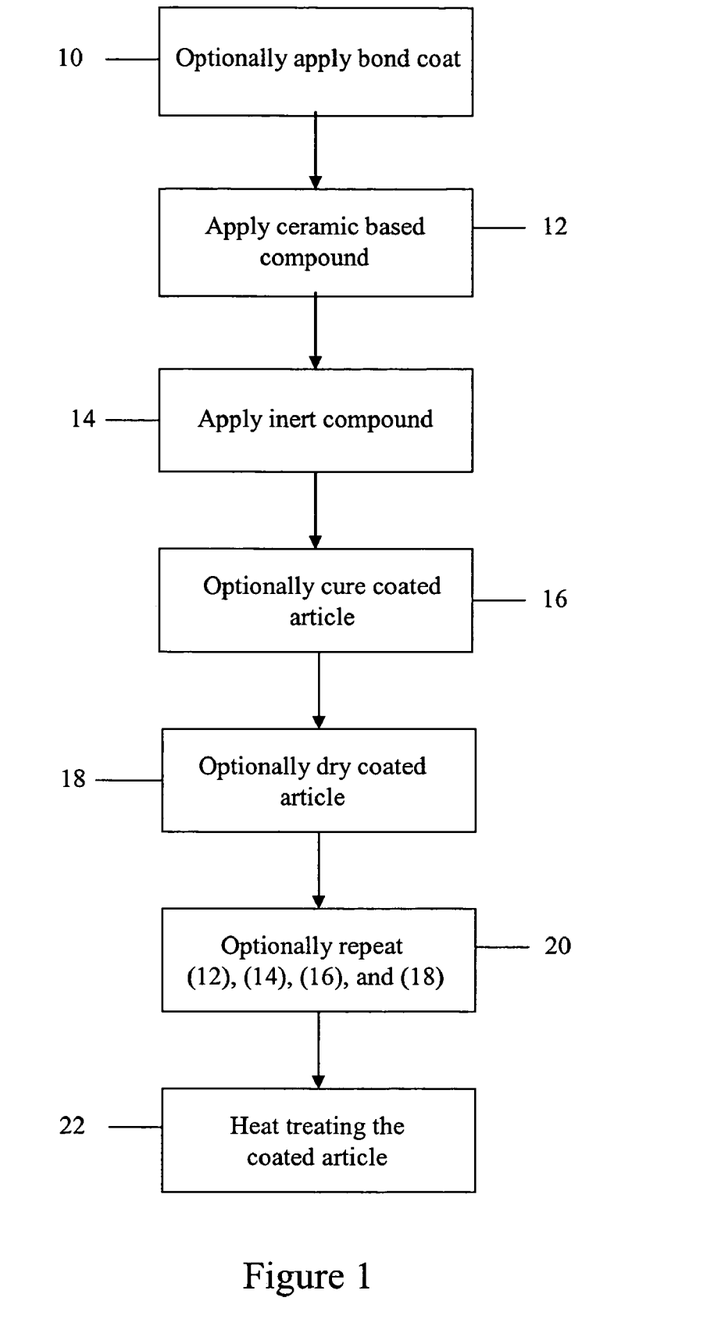
FIG. 1 is a flowchart representing one process of the present invention.
Figure 2:
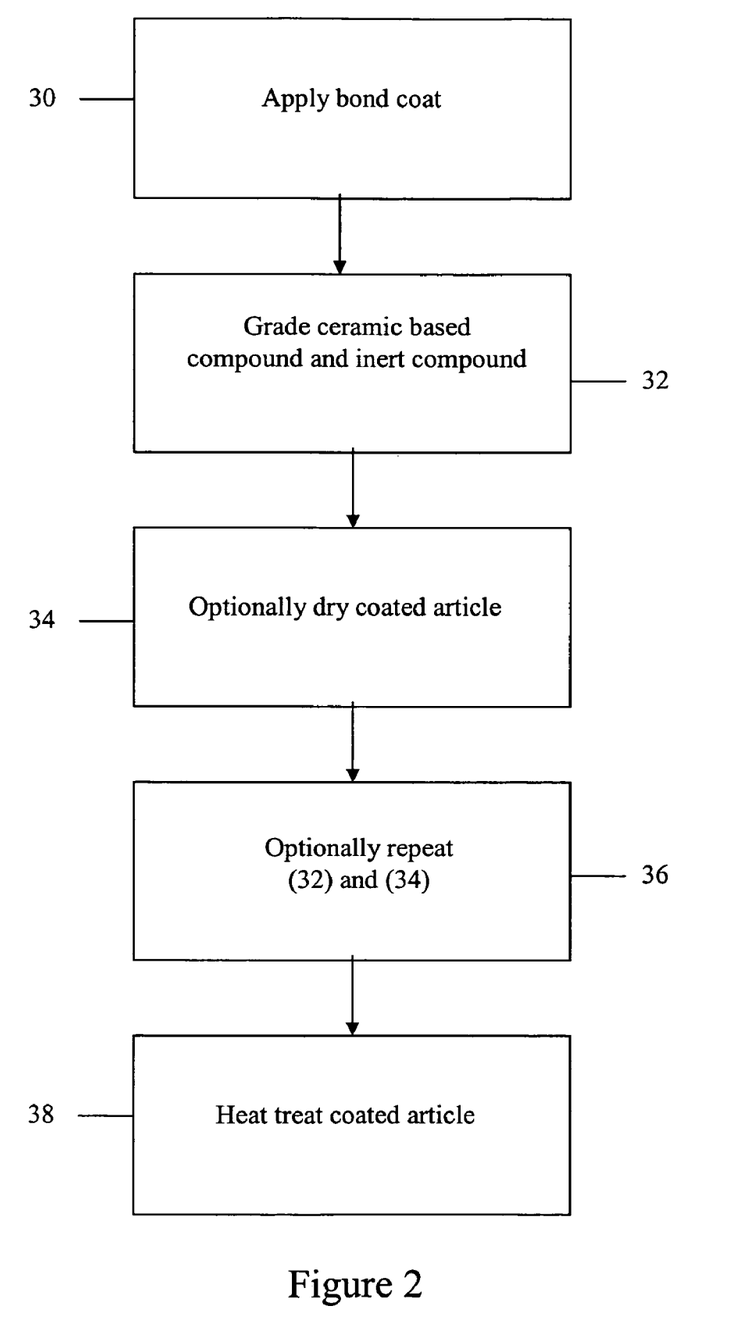
FIG. 2 is a flowchart representing another process of the present invention.
Figure 3:
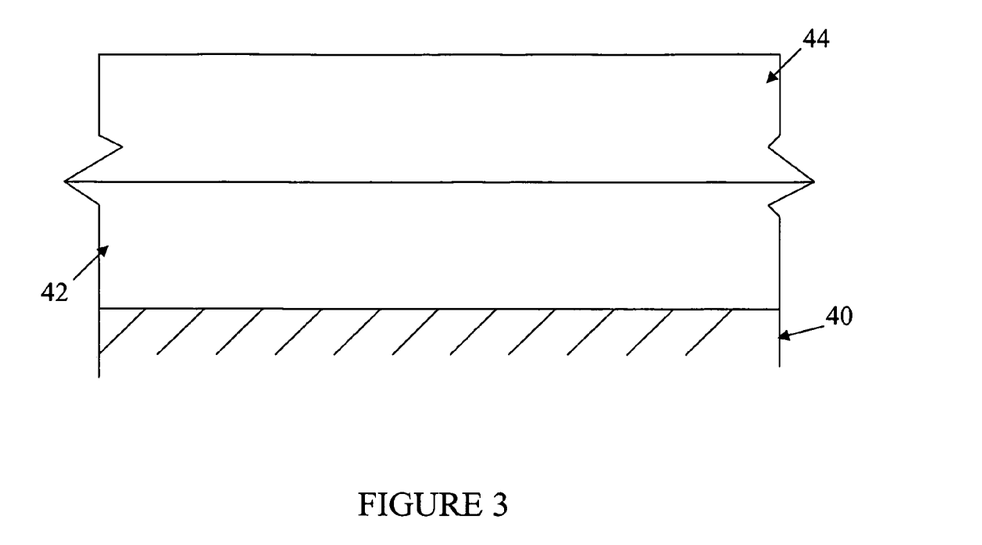
FIG. 3 is a representation of an article coated with at least one layer of a ceramic based compound and at least one layer of at least one inert compound of the present invention.

Referring now to FIGS. 1 and 2, a flowchart representing one of the processes of the present invention is shown. An article may be provided and may be coated with an optional bond coat material at a box 10 of FIG. 1 and at a box 30 of FIG. 2. The bond coat material may comprise a formula MCrAlY. MCrAlY refers to known metal coating systems in which M denotes nickel, cobalt, iron, their alloys, and mixtures thereof; Cr denotes chromium; Al denotes aluminum; and Y denotes yttrium. MCrAlY materials are often known as overlay coatings because they are applied in a predetermined composition and do not interact significantly with the substrate during the deposition process. For some non-limiting examples of MCrAlY materials see U.S. Pat. No. 3,528,861 which describes a FeCrAlY coating as does U.S. Pat. No. 3,542,530. In addition, U.S. Pat. No. 3,649,225 describes a composite coating in which a layer of chromium is applied to a substrate prior to the deposition of a MCrAlY coating. U.S. Pat. No. 3,676,085 describes a CoCrAlY overlay coating while U.S. Pat. No. 3,754,903 describes a NiCoCrAlY overlay coating having particularly high ductility. U.S. Pat. No. 4,078,922 describes a cobalt base structural alloy which derives improved oxidation resistance by virtue of the presence of a combination of hafnium and yttrium. A preferred MCrAlY bond coat composition is described in U.S. Pat. No. Re. 32,121, which is assigned to the present Assignee and incorporated herein by reference, as having a weight percent compositional range of 5-40 Cr, 8-35 Al, 0.1-2.0 Y, 0.1-7 Si, 0.1-2.0 Hf, balance selected from the group consisting of Ni, Co and mixtures thereof. See also U.S. Pat. No. 4,585,481, which is also assigned to the present Assignee and incorporated herein by reference.

The bond coat material may also comprise Al, PtAl and the like, that are often known in the art as diffusion coatings. In addition, the bond coat material may also comprise Al, PtAl, MCrAlY as described above, and the like, that are often known in the art as cathodic arc coatings.

The MCrAlY bond coat may be applied by any method capable of producing a dense, uniform, adherent coating of the desired composition, such as, but not limited to, an overlay bond coat, diffusion bond coat, cathodic arc bond coat, etc. Such techniques may include, but are not limited to, diffusion processes (e.g., inward, outward, etc.), low pressure plasma-spray, air plasma-spray, sputtering, cathodic arc, electron beam physical vapor deposition, high velocity plasma spray techniques (e.g., HVOF, HVAF), combustion processes, wire spray techniques, laser beam cladding, electron beam cladding, etc.

The particle size for the bond coat may be of any suitable size, and in embodiments may be between about 15 microns (0.015 mm) and about 60 microns (0.060 mm) with a mean particle size of about 25 microns (0.025 mm). The bond coat 30 may be applied to any suitable thickness, and in embodiments may be about 5 mils (0.127 mm) to about 10 mils (0.254 mm) thick. In some embodiments, the thickness may be about 6 mils (0.152 mm) to about 7 mils (0.178 mm) thick.

After applying the optional bond coat layer to the article, a ceramic based compound may be applied upon the optional bond coat layer or at least one surface of the coated article at a box 12 of FIG. 1. The ceramic based compound may be applied as a TBC to the article using any number of processes known to one of ordinary skill in the art. Suitable application processes include, but are not limited to, physical vapor deposition (e.g., electron beam), thermal spray (e.g., air plasma, high velocity oxygen fuel), sputtering, sol gel, slurry, combinations comprising at least one of the foregoing application processes, and the like.

Once the TBC is applied, at least one inert compound may be applied upon the TBC at a box 14 of FIG. 1. The at least one inert compound may be applied to the TBC using any number of processes known to one of ordinary skill in the art. Suitable application processes include, but are not limited to, physical vapor deposition (e.g., electron beam), thermal spray (e.g., air plasma, high velocity oxygen fuel), sputtering, sol gel, slurry, combinations comprising at least one of the foregoing application processes, and the like.

The TBC and the at least one inert compound may be applied using the same processes, for example, applying both the TBC and the at least one inert compound using a physical vapor deposition process. The TBC and the at least one inert compound may be applied separately such that a TBC may be formed and then a layer of at least one inert compound may be formed upon the TBC. The layers of TBC and at least one inert compound may be mechanically and/or chemically bonded, adhered and/or affixed to as a result of such application processes. Or, the TBC and the at least one inert compound may be applied in combination at a box 32 of FIG. 2. For example, the ceramic based compound and the at least one inert compound may be applied together and graded as known to one of ordinary skill in the art. Grading the ceramic based compound and the at least one inert compound may form a coating where the at least one inert compound may be present in an amount of about 100% at least at the surface of the graded coating.

In another embodiment of this process of the present invention, the TBC and the at least one inert compound may be applied using different processes at boxes 12 and 14 of FIG. 1, for example, applying the TBC using a physical vapor deposition process and applying the at least one inert compound using a thermal spraying process. The TBC and the at least one inert compound may then be applied separately to form a TBC and then a layer of at least one inert compound upon the TBC. The layers of TBC and at least one inert compound may be mechanically and/or chemically bonded, adhered and/or affixed to as a result of such application processes.

In an alternative embodiment, when applying the at least one inert compound using a solution based process such as sol gel and slurry (e.g., dipping, brushing, painting, etc.), the TBC coated article may be contacted with a solution comprising a suspension at box 14 of FIG. 1. The suspension may comprise a solvent, at least one inert compound, and at least one ultra-violet or heat curable resin, at least one dispersant and in the alternative, or in addition to, at least one surfactant. When the TBC comprises columnar structures with interstices, the article may contact the suspension at a temperature of about 68° F. (20° C.) to about 150° F. (66° C.) and initially under a vacuum of about 10 torr (0.19 psi) to about 100 torr (1.9 psi) for about 2 minutes to about 5 minutes at which point the pressure may then be adjusted to atmospheric pressure, that is, about 760 torr (14.7 psi). When the TBC comprises a tortuous, interconnected porosity, the article may contact the suspension at a temperature of about 68° F. (20° C.) to about 150° F. (66° C.) and initially under a vacuum of about 10 torr (0.19 psi) to about 100 torr (1.9 psi) for about 2 to about 10 minutes at which point the pressure may then be adjusted to atmospheric pressure. One of ordinary skill in the art will recognize this process is also known as vacuum impregnation. The goal is to draw out the air present in the interstices or porosity of the TBC in order to make room for the metal to enter. To further draw out the air the article may be agitated, for example, moved within the suspension, to force out any air remaining.

The coated article may then be treated with ultra-violet light energy or heat to cure the resin at a box 16 of FIG. 1. The coated article may be treated with ultra-violet light energy for about 10 second to about 60 seconds using processes known to one of ordinary skill in the art. In the alternative, when utilizing a heat curable resin, the coated article may be treated at a temperature of about 300° F. for about 20 minutes to about 60 minutes in an oven, or similar suitable apparatus, as known to one of ordinary skill in the art at box 16 of FIG. 1.

After curing the TBC coated article, the article may be dried to remove, that is, evaporate or burn off, the excess solvent, dispersant and/or resin materials. The article may be dried using any processes known to one of ordinary skill in the art suitable for use herein. Suitable drying processes include, but are not limited to, air drying, drying under pressure, drying under a heating element, combinations comprising at least one of the foregoing processes, and the like. The amount of time necessary to dry the article depends upon several factors and, in particular, the solvent of the suspension. For example, the TBC coated article may be dried at a temperature of about 750° F. to about 1600° F. for about 10 minutes to about 90 minutes in order to burn off the resin materials.

Suitable solvents for use in the suspension include, but are not limited to, water, alcohols, combinations comprising at least one of the foregoing solvents, and the like. Suitable dispersants may comprise organic dispersants which may evaporate and/or burn off easily during the drying step. Representative organic dispersants include, but are not limited to, polymethylmethacrylate (also known as "pmma"), polyvinyl alcohol, and the like. The aforementioned 'at least one dispersant' may be present in an amount of about 0.25% to about 3% by volume of the suspension.

An ultra-violet curable resin for use herein may comprise a resin, at least one of each of the following: initiator, additive, modifier, monomer, and oligomer. The resin may comprise a urethane based resin that may require one or more curing steps, for example, a dual curing resin. The at least one initiator may comprise a substance that initiates polymerization of the resin when exposed to ultra-violet light energy of a compatible wavelength. For a dual curing resin, two initiators may be required such that the second initiator may require heat in order to facilitate polymerization of the resin. Dual cure resins are effective when curing coatings where the ultra-violet light energy may not reach the resin material, such as in between the columnar or microcolumnar structures of the coating or at a certain depth in the coating as known to one of ordinary skill in the art. The at least one additive may comprise a filler chemical capable of enhancing one or more resin properties such as, but not limited to, flow rate, wetting, color, fluorescence and achieving tack-free surfaces. The at least one modifier may comprise a substance capable of increasing the durability, for example, impact resistance, crack resistance and the like, of the resin. The at least one monomer may comprise at least one single unit of a polymer capable of providing and/or enhancing adhesion to surface materials, for example, the adhesion of the resin to the surface of the article being coated. The at least one oligomer is recognized as the backbone of the resin and may comprise a polymer unit comprising about 6 to about 40 monomer units that imparts the basic properties of the ultra-violet curable resin such as, but not limited to, hardness, elongation, chemical resistance, and the like. In the alternative, the ultra-violet curable resin may be substituted with at least one heat curable resin as known to one of ordinary skill in the art.

After the TBC and at least one inert compound have been applied to the article, the coated article may be dried at a temperature of about 300° F. to about 750° F. for an amount of time necessary to dry the coating(s) and, if necessary, remove, that is, evaporate and/or burn off, the solvent of the application process at a box 18 of FIG. 1 and at a box 34 of FIG. 2. When applying the TBC using any thermal spray process, the drying step may become optional and/or omitted from the process. After drying the coating(s) and/or removing the solvent, boxes 12, 14, 16 and 18 of FIG. 1 or boxes 32 and 34 of FIG. 2 may be repeated as often as necessary in order to achieve the desired properties of the coating(s). Such properties include, but are not limited to, thickness, density, porosity and the like.

To facilitate the formation of the respective crystalline structures of the at least one inert compound, the coated article may be heat treated at a temperature of about 1200° F. (649° C.) to about 2000° F. (1093° C.) for about 30 minutes to about 360 minutes at a box 22 of FIG. 1 and a box 38 of FIG. 2. As the at least one inert compound dries under the aforementioned heat treatment conditions, the respective crystalline structures of the inert compounds form under such conditions.

The thermal barrier composition of the present invention formed from the aforementioned processes may comprise the aforementioned ceramic based compound and at least one inert compound, including at least one metal oxide formed during the ceramic barrier composition application process. The at least one inert compound may comprise a first inert compound, a second inert compound or a mixture of both the first inert compound and the second inert compound. More than two inert compounds may also be utilized.

The at least one inert compound may comprise an inert compound having a cubic crystalline structure comprising a formula (I):

$$A_3B_2X_3O_{12} \quad (I)$$

where A comprises at least one of the metals selected from the group consisting of $Ca^{+2}$, $Gd^{+3}$, $In^{+3}$, $Mg^{+2}$, $Na^+$, $K^+$, $Fe^{+2}$, $La^{+2}$, $Ce^{+2}$, $Pr^{+2}$, $Nd^{+2}$, Pm, Sm 2, $Eu^{+2}$, $Gd^{+2}$, $Tb^{+2}$, $Dy^{+2}$, $Ho^{+2}$, $Er^{+2}$, $TM^{+2}$, $Yb^{+2}$, $Lu^{+2}$, $Sc^{+2}$, $Y^{+2}$, $Ti^{+2}$, $Zr^{+2}$, $Hf^{+2}$, $V^{+2}$, $Ta^{+2}$, $Cr^{+2}$, $W^{+2}$, $Mn^{+2}$, $Tc^{+2}$, $Re^{+2}$, $Fe^{+2}$, $Os^{+2}$, $Co^{+2}$, $Ir^{+2}$, $Ni^{+2}$, $Zn^{+2}$, and $Cd^{+2}$; where B comprises at least one of the metals selected from the group consisting of $Zr^{+4}$, $Hf^{+4}$, $Gd^{+3}$, $Al^{+3}$, $Fe^{+3}$, $La^{+2}$, $Ce^{+2}$, $Pr^{+2}$, $Nd^{+2}$, $Pm^{+2}$, $Sm^{+2}$, $Eu^{+2}$, $Gd^{+2}$, $Tb^{+2}$, $Dy^{+2}$, $Ho^{+2}$, $Er^{+2}$, $Tm^{+2}$, $Yb^{+2}$, $Lu^{+2}$, $Ac^{+2}$, $Th^{+2}$, $Pa^{+2}$, $U^{+2}$, $Np^{+2}$, $Pu^{+2}$, $Am^{+2}$, $Cm^{+2}$, $Bk^{+2}$, $Cf^{+2}$, $Es^{+2}$, $Fm^{+2}$, $Md^{+2}$, $No^{+2}$, $Lr^{+2}$, $In^{+3}$, $Sc^{+2}$, $Y^{+2}$, $Cr^{+3}$, $Sc^{+3}$, $Y^{+3}$, $V^{+3}$, $Nb^{+3}$, $Cr^{+3}$, $Mo^{+3}$, $W^{+2}$, $Mn^{+3}$, $Fe^{+3}$, $Ru^{+2}$, $Co^{+3}$, $Rh^{+3}$, $Ir^{+3}$, $Ni^{+3}$, and $Au^{+3}$; where X comprises at least one of the metals selected from the group consisting of $Si^{+4}$, $Ti^{+4}$, $Al^{+4}$, $Fe^{+3}$, $Cr^{+3}$, $Sc^{+3}$, $Y^{+3}$, $V^{+3}$, $Nb^{+3}$, $Cr^{+3}$, $Mo^{+3}$, $W^{+3}$, $Mn^{+3}$, $Fe^{+3}$, $Ru^{+3}$, $Co^{+3}$, $Rh^{+3}$, $Ir^{+3}$, $Ni^{+3}$, and $Au^{+3}$; and where O is oxygen.

The at least one inert compound may also comprise an inert compound having a hexagonal crystalline structure comprising a formula (II):

$$A_4B_6X_6O_{26} \quad (II)$$

where A comprises at least one of the metals selected from the group consisting of is Ca+2, Mg+2, Fe+2, Na+, K+, Gd+3, Zr+4, Hf+4, Y+2, Sc+2, Sc+3, In+3, $La^{+2}$, $Ce^{+2}$, $Pr^{+2}$, $Nd^{+2}$, $Pm^{+2}$, $Sm^{+2}$, $Eu^{+2}$, $Gd^{+2}$, $Tb^{+2}$, $Dy^{+2}$, $Ho^{+2}$, $Er^{+2}$, $Tm^{+2}$, $Yb^{+2}$, $Lu^{+2}$, $Sc^{+2}$, $Y^{+2}$, $Ti^{+2}$, $Zr^{+2}$, $Hf^{+2}$, $V^{+2}$, $Ta^{+2}$, $Cr^{+2}$, $W^{+2}$, $Mn^{+2}$, $Tc^{+2}$, $Re^{+2}$, $Fe^{+2}$, $Os^{+2}$, $Co^{+2}$, $Ir^{+2}$, $Ni^{+2}$, $Zn^{+2}$, and $Cd^{+2}$; where B comprises at least one of the metals selected from the group consisting of $Gd^{+3}$, $Y^{+2}$, $Sc^{+2}$, $In^{+3}$, $Zr^{+4}$, $Hf^{+4}$, $Cr^{+3}$, $Sc^{+3}$, $Y^{+3}$, $V^{+3}$, $Nb^{+3}$, $Cr^{+3}$, $Mo^{+3}$, $W^{+3}$, $Mn^{+3}$, $Fe^{+3}$, $Ru^{+3}$, $Co^{+3}$, $Rh^{+3}$, $Ir^{+3}$, $Ni^{+3}$, and $Au^{+3}$; where X comprises at least one of the metals selected from the group consisting of $Si^{+4}$, $Ti^{+4}$, $Al^{+4}$, $Cr^{+3}$, $Sc^{+3}$, $Y^{+3}$, $V^{+3}$, $Nb^{+3}$, $Cr^{+3}$, $Mo^{+3}$, $W^{+3}$, $Mn^{+3}$, $Fe^{+3}$, $Ru^{+3}$, $Co^{+3}$, $Rh^{+3}$, $Ir^{+3}$, $Ni^{+3}$, and $Au^{+3}$; and where O is oxygen.

The at least one inert compound may also comprise a mixture of the inert compound of formula (I) and the inert compound of formula (II). In at least one embodiment of the present invention, the inert compound of formula (I) may comprise garnet. In at least one other embodiment of the present invention, the inert compound of formula (II) may comprise oxyapatite. In yet at least one other embodiment of the present invention, the aforementioned mixture may comprise both garnet and oxyapatite. Depending upon the application process, the at least one inert compound may be in a form suitable for use in the intended application process. For example, the at least one inert compound may be a fine particulate for use in sol gel, slurry or dipping processes, or may be a coarse particulate for use in a thermal spraying or physical vapor deposition processes, or may comprise a solid target for use in a sputtering process.

The resultant layer of the at least one inert compound, or the resultant graded layer of the ceramic based compound and the at least one inert compound, may have a porosity of no more than about 30% by volume of the at least one inert compound or the graded layer, and preferably no more than about 20% by volume of the at least one inert compound or the graded layer. The inert compounds of the present invention are inert or non-reactive to all of the ceramic based compounds currently used as thermal barrier compositions. In addition, the inert compounds are also inert or non-reactive to at least one component of the molten sand as described above. The inert properties, hardness of garnet and oxyapatite (alone or in combination), and resultant porosity values are enough to prevent the sand and CMAS from penetrating the TBC of the present invention and reaching the surface of the coated article.

Figure 4:
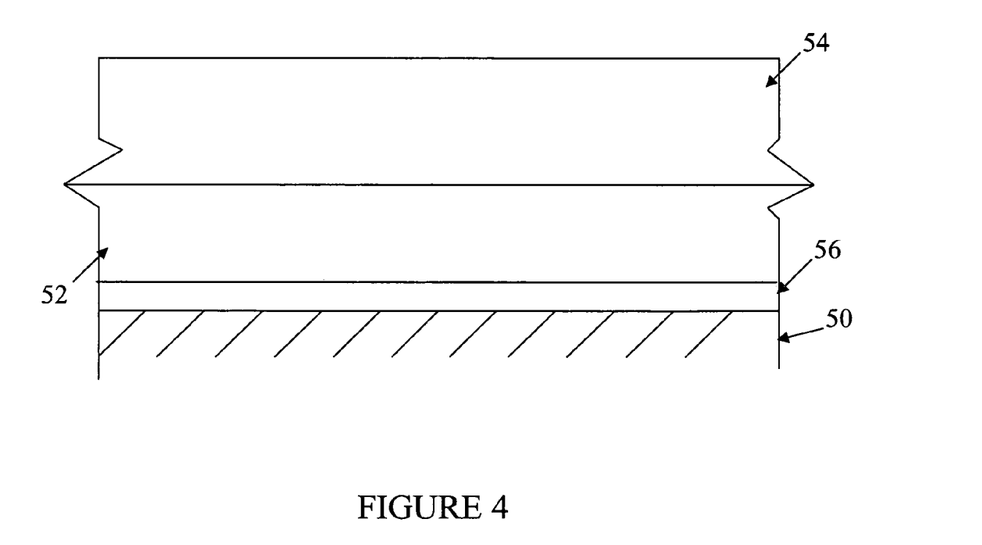
FIG. 4 is a representation of an article coated with at least one graded layer comprising at least one ceramic based compound and at least one inert compound of the present invention.
Figure 5:
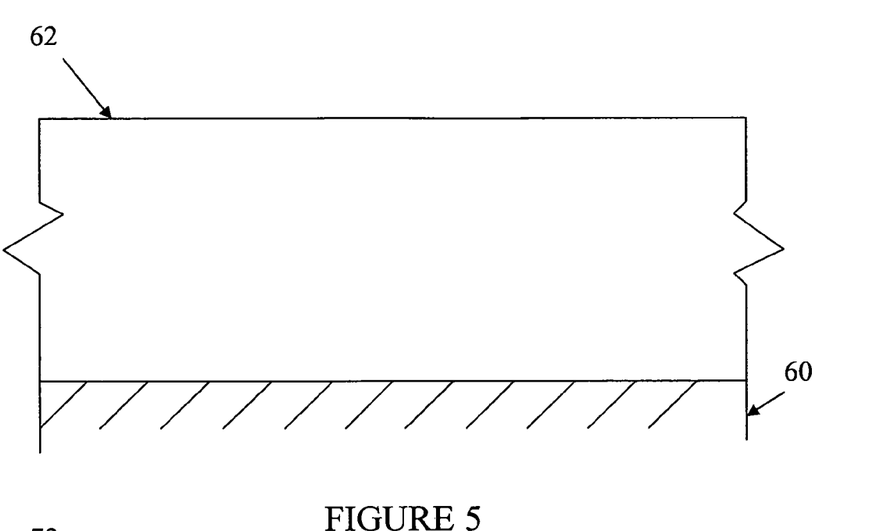
FIG. 5 is a representation of an article coated with an optional bond coat layer, at least one layer of a ceramic based compound and at least one layer of at least one inert compound of the present invention.
Figure 6:
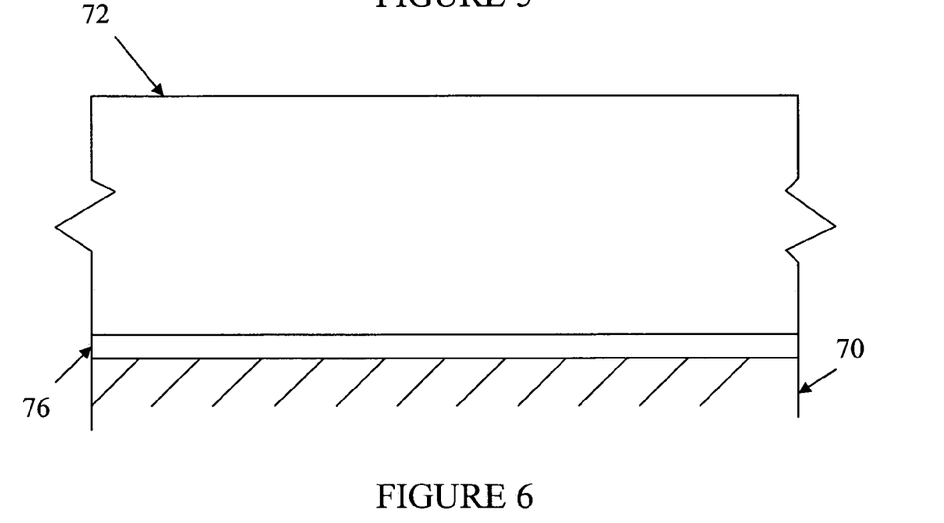
FIG. 6 is representation of an article coated with an optional bond coat layer, at least one graded layer comprising at least one ceramic based compound and at least one inert compound of the present invention.

Referring now to FIGS. 3-6, the resultant product in all of the processes of the present invention may be an article 40 coated with at least one layer of a ceramic based compound 42 and at least one layer of at least one inert compound 44 (See FIG. 3), or in the alternative, may be an article 50 coated with an optional bond coat layer 56, at least one layer of a ceramic based compound 52 and at least one layer of at least one inert compound 54 (See FIG. 4). In another embodiment, an article 60 coated with at least one graded layer 62 comprising both the ceramic based compound and at least one inert compound (See FIG. 5), or in the alternative, may be an article 70 coated with an optional bond coat layer 76, at least one graded layer 72 comprising both the ceramic based compound and at least one inert compound (See FIG. 6). As described earlier, the article may comprise a part used in turbomachinery applications such as, but not limited to, any part having an airfoil, any part having a seal, airfoils, seals, and the like. As known to one of ordinary skill in the art, TBC coatings for turbomachinery parts having seals, or seals in general, are typically thicker than TBC coatings for turbomachinery parts having an airfoil, or airfoils in general. Likewise, the coated articles of the present invention adhere to these industry standards known to one of ordinary skill in the art.

For example, the article may include, but is not limited to blades, vanes, stators, mid-turbine frames, and the like. And, in yet another example, the article may include, but is not limited to, seals, combustor panels, combustor chambers, combustor bulkhead shields, disk side plates, fuel nozzle guides, and the like.

Generally, coated articles having an airfoil, or a coated airfoil in general, of the present invention generally comprise a coating of the present invention of about 0.25 mils to about 15 mils in thickness. The coating layer of such thickness may comprise a graded layer or may comprise a layer of the at least one inert compound alone. And, generally, coated articles having a seal, or a coated seal in general, of the present invention comprise a coating of the present invention of about 0.25 mils to about 50 mils in thickness. The coating layer of such thickness may comprise a graded layer or may comprise a layer of the at least one inert compound alone. These ranges of coating thicknesses for such coated articles of the present invention may be broadened or narrowed depending upon the particular application of the article as will be recognized and understood by one of ordinary skill in the art.

The garnet and/or oxyapatite materials alone or in combination with the TBC coatings described herein may react may react with the CMAS, and/or other components, of the molten sand. The reaction product of the CMAS and garnet and/or oxyapatite may comprise further at least one reaction product as more than one reaction product may form during the useful life of the coated article of the present invention. For example, a garnet and/or oxyapatite layered or combined with a TBC such as 7YSZ may react with CMAS to form a reaction product comprising at least a complex oxide compound with the garnet crystalline structure and coexist with silicate oxyapatites, including at least simple oxides, less complex oxides and glass.

The reaction product or products form throughout the entirety of the garnet and/or oxyapatite, alone or in combination with the TBC, as the garnet and/or oxyapatite may be dispersed throughout the TBC and the molten sand penetrates through to the coated article's metal/ceramic interface.

The at least one reaction product forms a reaction barrier or sealant composition as a layer upon the TBC or throughout the TBC. The resultant sealant composition remains present as the TBC experiences typical wear and tear, for example, abrasion, erosion, spallation, etc., consistent with general use. Thus, as the TBC wears during its useful life, the sealant composition reforms, remains intact and effectively takes the place of and/or becomes the TBC. The resultant sealant layer may also exhibit the desired porosity of no more than about 30% by volume of the TBC, and preferably no more than about 20% by volume of the TBC.

One or more embodiments of the present invention have been described. Nevertheless, it will be understood that various modifications may be made without departing from the spirit and scope of the invention. Accordingly, other embodiments are within the scope of the following claims.

What is claimed is:

1. A process of coating an article, comprising:
   (1) applying a ceramic compound to at least one surface of an article to form a layer of ceramic compound;
   (2) applying at least one inert compound upon said ceramic compound layer to form a protective layer, wherein said at least one inert compound comprises a first inert compound comprising a cubic crystalline structure of formula (I):

$$A_3B_2X_3O_{12} \qquad (I)$$

where A comprises at least one of the metals selected from the group consisting of $Ca^{+2}$, $Gd^{+3}$, $In^{+3}$, $Mg^{+2}$, $Na^+$, $K^+$, $Fe^{+2}$, $La^{+2}$, $Ce^{+2}$, $Pr^{+2}$, $Nd^{+2}$, $Pm^{+2}$, $Sm^{+2}$, $Eu^{+2}$, $Gd^{+2}$, $Tb^{+2}$, $Dy^{+2}$, $Ho^{+2}$, $Er^{+2}$, $Tm^{+2}$, $Yb^{+2}$, $Lu^{+2}$, $Sc^{+2}$, $Y^{+2}$, $Ti^{+2}$, $Zr^{+2}$, $Hf^{+2}$, $V^{+2}$, $Ta^{+2}$, $Cr^{+2}$, $W^{+2}$, $Mn^{+2}$, $Tc^{+2}$, $Re^{+2}$, $Fe^{+2}$, $Os^{+2}$, $Co^{+2}$, $Ir^{+2}$, $Ni^{+2}$, $Zn^{+2}$, and $Cd^{+2}$;

where B comprises at least one of the metals selected from the group consisting of $Zr^{+4}$, $Hf^{+4}$, $Gd^{+3}$, $Al^{+3}$, $Fe^{+3}$, $La^{+2}$, $Ce^{+2}$, $Pr^{+2}$, $Nd^{+2}$, $Pm^{+2}$, $Sm^{+2}$, $Eu^{+2}$, $Gd^{+2}$, $Tb^{+2}$, $Dy^{+2}$, $Ho^{+2}$, $Er^{+2}$, $Tm^{+2}$, $Yb^{+2}$, $Lu^{+2}$, $In^{+3}$, $Sc^{+2}$, $Y^{+2}$, $Cr^{+3}$, $Sc^{+3}$, $Y^{+3}$, $V^{+3}$, $Nb^{+3}$, $Cr^{+3}$, $Mo^{+3}$, $W^{+3}$, $Mn^{+3}$, $Fe^{+3}$, $Ru^{+3}$, $Co^{+3}$, $Rh^{+3}$, $Ir^{+3}$, $Ni^{+3}$, and $Au^{+3}$;

where X comprises at least one of the metals selected from the group consisting of $Si^{+4}$, $Ti^{+4}$, $Al^{+4}$, $Fe^{+3}$, $Cr^{+3}$, $Sc^{+3}$, $Y^{+3}$, $V^{+3}$, $Nb^{+3}$, $Cr^{+3}$, $Mo^{+3}$, $W^{+3}$, $Mn^{+3}$, $Fe^{+3}$, $Ru^{+3}$, $Co^{+3}$, $Rh^{+3}$, $Ir^{+3}$, $Ni^{+3}$, and $Au^{+3}$; and where O is oxygen; and
   (3) heat treating said article.

2. The process of claim 1, further comprising (4) optionally drying said article prior to said heat treating step (3).

3. The process of claim 2, further comprising (5) optionally repeating steps (2) and (4) prior to said heat treating step (3).

4. The process of claim 1, wherein said applying said ceramic compound comprises applying said ceramic compound using a process selected from the group consisting of physical vapor deposition, thermal spraying, sputtering, sol gel and slurry.

5. The process of claim 4, wherein said physical vapor deposition process is an electron beam physical vapor deposition process.

6. The process of claim 4, wherein said thermal spraying process is a high velocity oxygen fuel thermal spraying process or an air plasma thermal spraying process.

7. The process of claim 1, wherein heat treating comprises heating said coated article at about 1200° F. to about 2000° F. for about 30 minutes to about 360 minutes.

8. The process of claim 1, wherein said applying said at least one inert compound comprises using a process selected from the group consisting of physical vapor deposition, thermal spraying, sputtering, sol gel, slurry, dipping, brushing, and painting.

9. The process of claim 8, wherein said physical vapor deposition process is an electron beam physical vapor deposition process.

10. The process of claim 8, wherein said thermal spraying process is an air plasma spraying process.

11. The process of claim 8, wherein said thermal spraying process is a high velocity oxygen fuel thermal spraying process.

12. The process of claim 1, wherein the process for applying said ceramic compound to said article is different than the process for applying said inert compound to said ceramic compound layer.

13. The process of claim 1, wherein the process for applying said ceramic compound to said article is the same as the process for applying said inert compound to said ceramic compound layer.

14. The process of claim 1, further comprising the step of applying a layer of bond coat material on at least one surface of said article prior to applying said layer of ceramic compound.

15. The process of claim 14, wherein said applying said bond coat layer comprises a process selected from the group consisting of diffusion processes, low pressure plasma-spray, air plasma-spray, sputtering, cathodic arc, electron beam physical vapor deposition, high velocity plasma spray processes, combustion processes, wire spray processes, laser beam cladding, and electron beam cladding.

16. The process of claim 1, wherein applying said at least one inert compound comprises the steps of:
    contacting said article with a suspension of said inert compound, and at least one of each of a dispersant, an ultraviolet curable resin and optionally a surfactant at a temperature of about 68° F. to about 150° F. at a pressure of about 10 torr to about 100 torr for about 2 minutes to about 5 minutes;
    curing said article using ultra-violet light energy for about 10 seconds to about 60 seconds; and
    heat treating said article at a temperature of about 750° F. to about 1600° F. for about 10 minutes to about 90 minutes.

17. The process of claim 1, wherein said applying said at least one inert compound comprises the steps of:
    contacting said article with a suspension of said inert compound, and at least one of each of a dispersant, a heat curable resin and optionally a surfactant at a temperature of about 68° F. to about 150° F. at a pressure of about 10 torr to about 100 torr for about 2 minutes to about 10 minutes;
    curing said article at a temperature of about 300° F. for about 20 minutes to about 60 minutes; and
    heat treating said article at a temperature of about 750° F. to about 1600° F. for about 10 to about 90 minutes.

18. A process for coating an article, comprising:
    (1) grading a ceramic compound and at least one inert compound upon at least one surface of an article to form a graded thermal barrier coating, wherein said at least one inert compound comprises a first inert compound comprising a cubic crystalline structure of formula (I):

$$A_3B_2X_3O_{12} \tag{I}$$

where A comprises at least one of the metals selected from the group consisting of $Ca^{+2}$, $Gd^{+3}$, $In^{+3}$, $Mg^{+2}$, $Na^+$, $K^+$, $Fe^{+2}$, $La^{+2}$, $Ce^{+2}$, $Pr^{+2}$, $Nd^{+2}$, $Pm^{+2}$, $Sm^{+2}$, $Eu^{+2}$, $Gd^{+2}$, $Tb^{+2}$, $Dy^{+2}$, $Ho^{+2}$, $Er^{+2}$, $Tm^{+2}$, $Yb^{+2}$, $Lu^{+2}$, $Sc^{+2}$, $Y^{+2}$, $Ti^{+2}$, $Zr^{+2}$, $Hf^{+2}$, $V^{+2}$, $Ta^{+2}$, $Cr^{+2}$, $W^{+2}$, $Mn^{+2}$, $Tc^{+2}$, $Re^{+2}$, $Fe^{+2}$, $Os^{+2}$, $Co^{+2}$, $Ir^{+2}$, $Ni^{+2}$, $Zn^{+2}$, and $Cd^{+2}$;

where B comprises at least one of the metals selected from the group consisting of $Zr^{+4}$, $Hf^{+4}$, $Gd^{+3}$, $Al^{+3}$, $Fe^{+3}$, $La^{+2}$, $Ce^{+2}$, $Pr^{+2}$, $Nd^{+2}$, $Pm^{+2}$, $Sm^{+2}$, $Eu^{+2}$, $Gd^{+2}$, $Tb^{+2}$, $Dy^{+2}$, $Ho^{+2}$, $Er^{+2}$, $Tm^{+2}$, $Yb^{+2}$, $Lu^{+2}$, $In^{+3}$, $Sc^{+2}$, $Y^{+2}$, $Cr^{+3}$, $Sc^{+3}$, $Y^{+3}$, $V^{+3}$, $Nb^{+3}$, $Cr^{+3}$, $Mo^{+3}$, $W^{+3}$, $Mn^{+3}$, $Fe^{+3}$, $Ru^{+3}$, $Co^{+3}$, $Rh^{+3}$, $Ir^{+3}$, $Ni^{+3}$, and $Au^{+3}$;

where X comprises at least one of the metals selected from the group consisting of $Si^{+4}$, $Ti^{+4}$, $Al^{+4}$, $Fe^{+3}$, $Cr^{+3}$, $Sc^{+3}$, $Y^{+3}$, $V^{+3}$, $Nb^{+3}$, $Cr^{+3}$, $Mo^{+3}$, $W^{+3}$, $Mn^{+3}$, $Fe^{+3}$, $Ru^{+3}$, $Co^{+3}$, $Rh^{+3}$, $Ir^{+3}$, $Ni^{+3}$, and $Au^{+3}$; and where O is oxygen; and (2) heat treating said coated article.

19. The process of claim 18, further comprising (3) optionally drying said coated article prior to said heat treating step.

20. The process of claim 19, further comprising (4) optionally repeating steps (1) and (3) prior to said heat treating step.

21. The process of claim 18, wherein said grading comprises a method selected from the group consisting of physical vapor deposition, thermal spraying, sputtering, sol gel and slurry.

22. The process of claim 21, wherein said physical vapor deposition process is an electron beam physical vapor deposition process.

23. The process of claim 19, wherein said thermal spraying process is a high velocity oxygen fuel thermal spraying process or an air plasma thermal spraying process.

24. The process of claim 18, wherein said heat treating comprises heating said coated article at about 1200° F. to about 2000° F. for about 30 minutes to about 360 minutes.

25. The process of claim 18, wherein said grading comprises forming said graded thermal barrier coating having at least a surface where said at least one inert compound is present in an amount of about 100 percent by weight of said graded thermal barrier coating.

26. The process of claim 18, further comprising the step of applying a layer of bond coat material on at least one surface of said article prior to applying said layer of ceramic compound.

27. The process of claim 26, wherein said applying said bond coat layer comprises a process selected from the group consisting of diffusion processes, low pressure plasma-spray, air plasma-spray, sputtering, cathodic arc, electron beam physical vapor deposition, high velocity plasma spray processes, combustion processes, wire spray processes, laser beam cladding, and electron beam cladding.

28. A coated substrate comprising the substrate and a thermal barrier coating, the thermal barrier coating comprising:
a ceramic compound; and
at least one inert compound, wherein said at least one inert compound comprises a first inert compound comprising a cubic crystalline structure of formula (I):

$$A_3B_2X_3O_{12} \tag{I}$$

where A comprises at least one of the metals selected from the group consisting of $Ca^{+2}$, $Gd^{+3}$, $In^{+3}$, $Mg^{+2}$, $Na^+$, $K^+$, $Fe^{+2}$, $La^{+2}$, $Ce^{+2}$, $Pr^{+2}$, $Nd^{+2}$, $Pm^{+2}$, $Sm^{+2}$, $Eu^{+2}$, $Gd^{+2}$, $Tb^{+2}$, $Dy^{+2}$, $Ho^{+2}$, $Er^{+2}$, $Tm^{+2}$, $Yb^{+2}$, $Lu^{+2}$, $Sc^{+2}$, $Y^{+2}$, $Ti^{+2}$, $Zr^{+2}$, $Hf^{+2}$, $V^{+2}$, $Ta^{+2}$, $Cr^{+2}$, $W^{+2}$, $Mn^{+2}$, $Tc^{+2}$, $Re^{+2}$, $Fe^{+2}$, $Os^{+2}$, $Co^{+2}$, $Ir^{+2}$, $Ni^{+2}$, $Zn^{+2}$, and $Cd^{+2}$;

where B comprises at least one of the metals selected from the group consisting of $Zr^{+4}$, $Hf^{+4}$, $Gd^{+3}$, $Al^{+3}$, $Fe^{+3}$, $La^{+2}$, $Ce^{+2}$, $Pr^{+2}$, $Nd^{+2}$, $Pm^{+2}$, $Sm^{+2}$, $Eu^{+2}$, $Gd^{+2}$, $Tb^{+2}$, $Dy^{+2}$, $Ho^{+2}$, $Er^{+2}$, $Tm^{+2}$, $Yb^{+2}$, $Lu^{+2}$, $In^{+3}$, $Sc^{+2}$, $Y^{+2}$, $Cr^{+3}$, $Sc^{+3}$, $Y^{+3}$, $V^{+3}$, $Nb^{+3}$, $Cr^{+3}$, $Mo^{+3}$, $W^{+3}$, $Mn^{+3}$, $Fe^{+3}$, $Ru^{+3}$, $Co^{+3}$, $Rh^{+3}$, $Ir^{+3}$, $Ni^{+3}$, and $Au^{+3}$;

where X comprises at least one of the metals selected from the group consisting of $Si^{+4}$, $Ti^{+4}$, $Al^{+4}$, $Fe^{+3}$, $Cr^{+3}$, $Sc^{+3}$, $Y^{+3}$, $V^{+3}$, $Nb^{+3}$, $Cr^{+3}$, $Mo^{+3}$, $W^{+3}$, $Mn^{+3}$, $Fe^{+3}$, $Ru^{+3}$, $Co^{+3}$, $Rh^{+3}$, $Ir^{+3}$, $Ni^{+3}$, and $Au^{+3}$; and where O is oxygen.

29. The coated substrate of claim 28, wherein said ceramic compound comprises a stabilized zirconate or a stabilized hafnate.

30. The coated substrate of claim 28, wherein said ceramic compound is selected from the group consisting of yttria stabilized zirconia, calcia stabilized zirconia, magnesia stabilized zirconia, yttria stabilized hafnia, calcia stabilized hafnia and magnesia stabilized hafnia.

31. The coated substrate of claim 28, wherein said first inert compound is garnet.

32. The coated substrate of claim 28, wherein said at least one inert compound comprises a porosity of no more than about 30% by volume of said at least one inert compound.

33. The coated substrate of claim 28, wherein said at least one inert compound comprises a porosity of no more than about 20% by volume of said at least one inert compound.

34. A coated article, comprising:
an article comprising at least one surface comprising a thermal barrier coating disposed thereupon, wherein said thermal barrier coating comprises:
a ceramic compound; and
at least one inert compound comprising a first inert compound comprising a cubic crystal structure of formula (I):

$$A_3B_2X_3O_{12} \tag{I}$$

where A comprises at least one of the metals selected from the group consisting of $Ca^{+2}$, $Gd^{+3}$, $In^{+3}$, $Mg^{+2}$, $Na^+$, $K^+$, $Fe^{+2}$, $La^{+2}$, $Ce^{+2}$, $Pr^{+2}$, $Nd^{+2}$, $Pm^{+2}$, $Sm^{+2}$, $Eu^{+2}$, $Gd^{+2}$, $Tb^{+2}$, $Dy^{+2}$, $Ho^{+2}$, $Er^{+2}$, $Tm^{+2}$, $Yb^{+2}$, $Lu^{+2}$, $Sc^{+2}$, $Y^{+2}$, $Ti^{+2}$, $Zr^{+2}$, $Hf^{+2}$, $V^{+2}$, $Ta^{+2}$, $Cr^{+2}$, $W^{+2}$, $Mn^{+2}$, $Tc^{+2}$, $Re^{+2}$, $Fe^{+2}$, $Os^{+2}$, $Co^{+2}$, $Ir^{+2}$, $Ni^{+2}$, $Zn^{+2}$, and $Cd^{+2}$;

where B comprises at least one of the metals selected from the group consisting of $Zr^{+4}$, $Hf^{+4}$, $Gd^{+3}$, $Al^{+3}$, $Fe^{+3}$, $La^{+2}$, $Ce^{+2}$, $Pr^{+2}$, $Nd^{+2}$, $Pm^{+2}$, $Sm^{+2}$, $Eu^{+2}$, $Gd^{+2}$, $Tb^{+2}$, $Dy^{+2}$, $Ho^{+2}$, $Er^{+2}$, $Tm^{+2}$, $Yb^{+2}$, $Lu^{+2}$, $In^{+3}$, $Sc^{+2}$, $Y^{+2}$, $Cr^{+3}$, $Sc^{+3}$, $Y^{+3}$, $V^{+3}$, $Nb^{+3}$, $Cr^{+3}$, $Mo^{+3}$, $W^{+3}$, $Mn^{+3}$, $Fe^{+3}$, $Ru^{+3}$, $Co^{+3}$, $Rh^{+3}$, $Ir^{+3}$, $Ni^{+3}$, and $Au^{+3}$;

where X comprises at least one of the metals selected from the group consisting of $Si^{+4}$, $Ti^{+4}$, $Al^{+4}$, $Fe^{+3}$, $Cr^{+3}$, $Sc^{+3}$, $Y^{+3}$, $V^{+3}$, $Nb^{+3}$, $Cr^{+3}$, $Mo^{+3}$, $W^{+3}$, $Mn^{+3}$, $Fe^{+3}$, $Ru^{+3}$, $Co^{+3}$, $Rh^{+3}$, $Ir^{+3}$, $Ni^{+3}$, and $Au^{+3}$; and where O is oxygen.

35. The coated article of claim 34, wherein said first inert compound comprises a first layer disposed upon a second layer comprising said ceramic compound.

36. The coated article of claim 35, wherein said first layer comprises a thickness of about 0.25 mils to about 50 mils.

37. The coated article of claim 35, wherein said first layer comprises a thickness of about 0.25 mils to about 15 mils.

38. The coated article of claim 34, wherein said first inert compound and said ceramic compound comprise a graded layer.

39. The coated article of claim 38, wherein at least a surface of said graded layer comprises said at least one inert compound present in an amount of about 100 percent by weight of said layer.

40. The coated article of claim 34, wherein said first layer comprises a thickness of about 0.25 mils to about 50 mils.

41. The coated article of claim 40, wherein said first layer comprises a thickness of about 0.25 mils to about 15 mils.

42. The coated article of claim 40, wherein at least a surface of said graded layer comprises said at least one inert compound present in an amount of about 100 percent by weight of said layer.

43. The coated article of claim 34, wherein said ceramic compound comprises a stabilized zirconate or a stabilized hafnate.

44. The coated article of claim 34, wherein said ceramic compound is selected from the group consisting of yttria stabilized zirconia, calcia stabilized zirconia, magnesia stabilized zirconia, yttria stabilized hafnia, calcia stabilized hafnia and magnesia stabilized hafnia.

45. The coated article of claim 34, wherein said first inert compound is garnet.

46. The coated article of claim 34, wherein said at least one inert compound comprises a porosity of no more than about 30% by volume of said at least one inert compound.

47. The coated article of claim 46, wherein said at least one inert compound comprises a porosity of no more than about 20% by volume of said at least one inert compound.

48. The coated article of claim 34, wherein said article is selected from the group consisting of blades, vanes, stators, and mid-turbine frames.

49. The coated article of claim 48, wherein said at least one inert compound comprises a layer having a thickness of about 5 mils to about 15 mils.

50. The coated article of claim 34, wherein said article is selected from the group consisting of seals, combustor panels, combustor chambers, combustor bulkhead shields, disk side plates and fuel nozzle guides.

51. The coated article of claim 50, wherein said at least one inert compound comprises a layer having a thickness of about 0.5 mils to about 50 mils.

52. The coated article of claim 34, further comprising a bond coat material disposed upon said at least one surface of said article and between said surface and said thermal barrier coating.

53. The coated article of claim 52, wherein said bond coat layer comprises a layer having a thickness of about 5 mils to about 10 mils.

54. The coated article of claim 52, wherein said bond coat material comprises a formula MCrAlY, wherein M comprises a metal selected from the group consisting of nickel, cobalt, iron, platinum and their alloys.

55. The coated article of claim 52, wherein said bond coat material comprises a bond coat material selected from the group consisting of aluminum, platinum, and mixtures thereof.

56. The coated article of claim 52, wherein said bond coat material comprises a bond coat material selected from the group consisting of aluminum, platinum, and MCrAlY, wherein M of said MCrAlY is a metal selected from the group consisting of nickel, cobalt, and iron, and mixtures thereof.

57. A coated substrate comprising a substrate and a coating, the coating comprising:
a reaction product of at least one silica material and a thermal barrier coating composition comprising:
a ceramic compound; and
at least one inert compound,
wherein said at least one inert compound comprises a first inert compound comprising a cubic crystalline structure of formula (I):

$$A_3B_2X_3O_{12} \qquad (I)$$

where A comprises at least one of the metals selected from the group consisting of $Ca^{+2}$, $Gd^{+3}$, $In^{+3}$, $Mg^{+2}$, $Na^+$, $K^+$, $Fe^{+2}$, $La^{+2}$, $Ce^{+2}$, $Pr^{+2}$, $Nd^{+2}$, $Pm^{+2}$, $Sm^{+2}$, $Eu^{+2}$, $Gd^{+2}$, $Tb^{+2}$, $Dy^{+2}$, $Ho^{+2}$, $Er^{+2}$, $Tm^{+2}$, $Yb^{+2}$, $Lu^{+2}$, $Sc^{+2}$, $Y^{+2}$, $Ti^{+2}$, $Zr^{+2}$, $Hf^{+2}$, $V^{+2}$, $Ta^{+2}$, $Cr^{+2}$, $W^{+2}$, $Mn^{+2}$, $Tc^{+2}$, $Re^{+2}$, $Fe^{+2}$, $Os^{+2}$, $Co^{+2}$, $Ir^{+2}$, $Ni^{+2}$, $Zn^{+2}$, and $Cd^{+2}$;

where B comprises at least one of the metals selected from the group consisting of $Zr^{+4}$, $Hf^{+4}$, $Gd^{+3}$, $Al^{+3}$, $Fe^{+3}$, $La^{+2}$, $Ce^{+2}$, $Pr^{+2}$, $Nd^{+2}$, $Pm^{+2}$, $Sm^{+2}$, $Eu^{+2}$, $Gd^{+2}$, $Tb^{+2}$, $Dy^{+2}$, $Ho^{+2}$, $Er^{+2}$, $Tm^{+2}$, $Yb^{+2}$, $Lu^{+2}$, $In^{+3}$, $Sc^{+2}$, $Y^{+2}$, $Cr^{+3}$, $Sc^{+3}$, $Y^{+3}$, $V^{+3}$, $Nb^{+3}$, $Cr^{+3}$, $Mo^{+3}$, $W^{+3}$, $Mn^{+3}$, $Fe^{+3}$, $Ru^{+3}$, $Co^{+3}$, $Rh^{+3}$, $Ir^{+3}$, $Ni^{+3}$, and $Au^{+3}$;

where X comprises at least one of the metals selected from the group consisting of $Si^{+4}$, $Ti^{+4}$, $Al^{+4}$, $Fe^{+3}$, $Cr^{+3}$, $Sc^{+3}$, $Y^{+3}$, $V^{+3}$, $Nb^{+3}$, $Cr^{+3}$, $Mo^{+3}$, $W^{+3}$, $Mn^{+3}$, $Fe^{+3}$, $Ru^{+3}$, $Co^{+3}$, $Rh^{+3}$, $Ir^{+3}$, $Ni^{+3}$, and $Au^{+3}$; and where O is oxygen.

58. The coated substrate of claim 57, wherein the coating comprises a porosity of no more than about 30% by volume of the coating.

59. The coated substrate of claim 58, wherein the coating comprises a porosity of no more than about 20% by volume of the coating.

* * * * *

UNITED STATES PATENT AND TRADEMARK OFFICE
CERTIFICATE OF CORRECTION

PATENT NO. : 7,622,195 B2  Page 1 of 1
APPLICATION NO. : 11/328895
DATED : November 24, 2009
INVENTOR(S) : Schlichting et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 568 days.

Signed and Sealed this

Twenty-sixth Day of October, 2010

David J. Kappos
*Director of the United States Patent and Trademark Office*